United States Patent Office 3,635,936
Patented Jan. 18, 1972

3,635,936
PRODUCTION OF HOMOPOLYMERS OF ETHYLENE USING HYDROPEROXY-ALKYLPHENYL-ALKANES AS CATALYST
Hans Gropper and Franz Mietzner, Ludwigshafen, Klaus Kinkel, Rodenkirchen, and Friedrich Urban, Limburgerhof, Germany, assignors to Badische Anilin- & Soda-Fabrik Aktiengesellschaft, Ludwigshafen, Germany
No Drawing. Filed Oct. 20, 1969, Ser. No. 867,859
Claims priority, application Germany, Oct. 26, 1968, P 18 05 635.4
Int. Cl. C08f 3/04, 1/60
U.S. Cl. 260—94.9 R          2 Claims

ABSTRACT OF THE DISCLOSURE

A process for the production of homopolymers of ethylene by polymerization of ethylene at high pressure and elevated temperature using a mixture of a hydroperoxide and oxygen as a polymerization initiator with or without a polymerization regulator. An essential feature of the process according to the invention is the use of hydroperoxides of a specially selected class of compounds.

---

The present invention relates to a process for the production of homopolymers of ethylene by polymerization of ethylene at pressures of from 1,000 to 7,000 atmospheres and temperatures of from 200° to 400° C. using mixtures of hydroperoxides and oxygen as polymerization initiators with or without polymerization regulators.

Processes of this type (the polymerization initiators being mixtures of hydroperoxides and oxygen) give higher yields of polymers than other comparable methods (cf. for example U.S. Pat. No. 3,092,614). It is a disadvantage of the prior art processes that polymers are obtained which, in the form of film or sheeting, either have good transparency and a poor blocking value or have poor transparency and a good blocking value.

The object of the present invention is to provide a process of the type mentioned above with which it is possible to prepare polymers which, in the form of film or sheeting, have both good transparency and a good blocking value.

We have found that this object is achieved when a mixture of a special hydroperoxide and oxygen is used as the polymerization initiator.

The present invention accordingly comprises a process for the porduction of homopolymers of ethylene by polymerization of ethylene at pressures of from 1,000 to 7,000 atmospheres, preferably from 1,500 to 3,500 atmospheres, and temperatures of from 200° to 400° C., preferably from 250° to 370° C., using a mixture of a hydroperoxide and oxygen as a polymerization initiator with or without a polymerization regulator. The process according to this invention is characterized in that the polymerization initiator used is a mixture of:

(a) From 0.5 to 30, preferably from 1 to 6, mole-p.p.m. (with reference to the ethylene to be polymerized) of a hydroperoxide having the general formula:

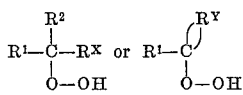

in which:

$R^1$ denotes a $C_1$ to $C_4$ alkyl group, preferably a methyl group;
$R^2$ denotes a $C_1$ to $C_4$ alkyl group, preferably a methyl group;
$R^x$ denotes a $C_5$ to $C_{14}$ alicyclic ring system or a $C_6$, $C_{10}$ or $C_{14}$ aromatic ring system in which up to four hydrogen atoms may be replaced by $C_1$ to $C_8$ alkyl groups; and
$R^y$ denotes the radical of a $C_4$ to $C_{13}$ alicyclic ring system in which up to four hydrogen atoms may be replaced by $C_1$ to $C_8$ alkyl groups; and (b) From 2 to 50, preferably from 5 to 30, mole-p.p.m. (with reference to the ethylene to be polymerized) of oxygen.

A particularly advantageous embodiment of the process according to this invention is one in which the polymerization initiator used in a mixture of:

(a) From 0.5 to 30, preferably from 1 to 6, mole-p.p.m. (with reference to the ethylene to be polymerized) of a hydroperoxide having the formula:

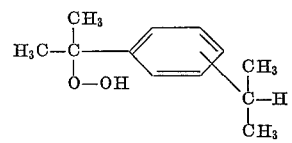

and (b) From 2 to 50, preferably from 5 to 30, mole-p.p.m. (with reference to the ethylene to be polymerized) of oxygen.

The process according to the invention is distinguished from comparable prior art methods mainly by the fact that it gives polymers which, in the form of sheeting or film, have both good transparency and a good blocking value. Another advantage is that high yields are obtained and that the hydroperoxides used can be handled in admixture with ethylene without special safety precautions.

The process may be carried out using conventional equipment. Carrying out the process continuously has proved to be especially advantageous, particularly in tubular reactors such as are conventionally used for the high-pressure polymerization of ethylene (cf. "Ullmann's Encyklopädie der technischen Chemie," 3rd edition (1963), volume 14, pages 139 et seq.). Other reactors, for example stirred autoclaves may however also be used.

The following are examples of hydroperoxides which may be used according to this invention:

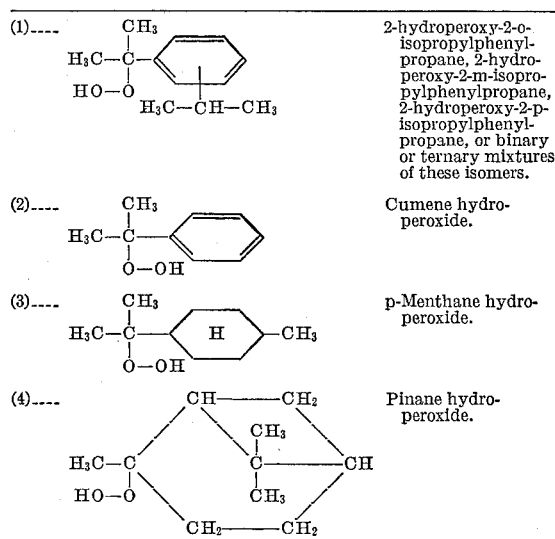

It is generally advantageous to use the hydroperoxides in the form of a solution (for example 1 to 20% by weight) in an inert solvent such as benzene or isooctane.

Like prior are processes, the process according to this invention may be carried out in the presence of a polymerization regulator. Suitable regulators include hydrogen, ketones, alcohols and ethers (advantageously in amounts of from 0.1 to 5 mole percent with reference to the ethylene to be polymerized) as well as normal or branched $C_3$ or higher hydrocarbons (advantageously in amounts of from 0.005 to 5 mole percent with reference to the ethylene to be polymerized).

The products of the process (homopolymers of ethylene) are particularly suitable for the production of film and sheeting because in these products high transparency and a good blocking behavior are particularly desirable.

The following examples illustrate the invention.

The polymerization apparatus used in accordance with the following examples is a tubular reactor such as is conventionally used in the continuous high-pressure polymerization of ethylene. The ratio of the diameter of the reaction tube to its length is 1:14,000. The reaction tube is surrounded by a jacket tube for a heat transfer medium. The jacket tube is subdivided into two zones which can be operated independently of each other, the first (zone (I)) extending over two-fifths of the length of tube and the second (zone (II)) over the remaining three-fifths of the length of the tube. There is a valve at the end of the reaction tube which serves (a) to regulate the pressure in the polymerization zone and (b) to discharge the reaction product. Attached to this valve there are provided the conventional high-pressure and low-pressure separators for the separation of the polymer from nonpolymerized material, i.e. mainly from the amount of ethylene which has not been involved in the polymerization.

EXAMPLE 1

A mixture (compressed to 2,300 atmospheres) consisting of 1,000,000 parts by weight per hour of ethylene, 2 parts by weight per hour (equivalent to 3.5 mole-p.p.m. with reference to ethylene) of 2-hydroperoxy-2-p-isopropyl-phenylpropane (dissolved in isooctane; 2% by weight), 10 parts by weight per hour (equivalent to 8.8 mole-p.p.m. with reference to ethylene) of oxygen and 15,000 parts by weight per hour of acetone (as polymerization regulator) is fed into the reactor at the inlet end. The heat transfer medium in zone (I) of the reactor jacket is kept at a constant temperature of 170° C. and that in zone (II) at 185° C.; the reaction material thus reaches a maximum temperature of 320° C. as a result of the evolution of the heat of reaction.

260,000 parts by weight per hour of a polyethylene is obtained which (in the form of a film having a thickness of 40 millimicrons) has good transparency (amount of scattering: 11%) and a good blocking value (2.1). Other characteristic data are: melt index (according to ASTM–D–1238)=4; density (according to DIN 53,479/7.2)= 0.925 g./cm.³

Comparative experiment (α) The above procedure is exactly followed except that no hydroperoxide is used and that 46 parts by weight (instead of 10 parts by weight) per hour of oxygen is used (equivalent to 44 mole-p.p.m. with reference to ethylene). The film obtained has an amount of scattering of 17% and a blocking value of 3.0.

(β) Again the above procedure is exactly followed except that no oxygen is used and that 60 parts by weight (instead of 24 parts by weight) per hour of the hydroperoxide (equivalent to 8.8 mole-p.p.m. with reference to ethylene) is used. The film obtained has an amount of scattering of 16% and a blocking value of 3.1.

EXAMPLE 2

The reactor is fed at the inlet end with a mixture (compressed to 2,000 atmospheres) consisting of 1,000,000 parts by weight per hour of ethylene, 30 parts by weight per hour (equivalent to 5.1 mole-p.p.m. with reference to ethylene) of p-methane hydroperoxide (dissolved in isooctane; 2% by weight), 26 parts by weight per hour (equivalent to 23 mole-p.p.m. with reference to ethylene) of oxygen and 5,000 parts by weight per hour of acetone (as polymerization regulator). The heat transfer medium in the reactor jacket is kept at a constant temperature of 185° C. in zone (I) and at 190° C. in zone (II); the reaction mixture thus reaches a maximum temperature of 315° C. as a result of the liberation of the heat of reaction.

In this way 28,000 parts by weight per hour of a polyethylene is obtained which (in the form of sheeting or film) has good transparency and a good blocking value. Other characteristic data are: melt index (according to ASTM–D–1238)=1.6; density (according to DIN 53,- 479/7.2)=0.9195 g./cm.³

We claim:

1. In a process for the production of homopolymers of ethylene by polymerization of ethylene at a pressure of from 1,000 to 7,000 atmospheres and a temperature of from 200° to 400° C. using a mixture of a peroxide and oxygen as the polymerization initiator, the improvement which comprises conducting said polymerization with a polymerization initiator which is a mixture of:

(a) from 0.5 to 30 mole-p.p.m. (with erference to the ethylene to be polymerized) of a hydroperoxide having the formula:

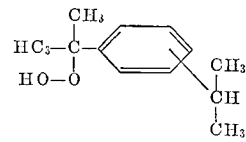

and (b) from 2 to 50 mole-p.p.m. (with reference to the ethylene to be polymerized) of oxygen.

2. A process as claimed in claim 1 wherein the hydroperoxide used is 2-hydroperoxy-2-o-isopropylphenylpropane. 2-hydroperoxy-2-m-isopropylphenylpropane, 2-hydroperoxy-2-p-isopropylphenylpropane or a binary or ternary mixture of the said isomers.

References Cited

UNITED STATES PATENTS

| | | | |
|---|---|---|---|
| 2,820,064 | 1/1958 | Greene et al. | 252—426 X |
| 2,909,513 | 10/1959 | Overbaugh | 260—94.9 |
| 3,092,614 | 6/1963 | Erdmann et al. | 260—94.9 |
| 3,142,666 | 7/1964 | Deex et al. | 260—94.9 |

FOREIGN PATENTS

| | | | |
|---|---|---|---|
| 1,248,020 | 8/1967 | Germany | 252—426 |

JOSEPH L. SCHOFER, Primary Examiner

A. HOLLER, Assistant Examiner